United States Patent [19]

Troglin

[11] 4,275,699
[45] Jun. 30, 1981

[54] GASOLINE VAPOR COMPLETE BURNING CARBURETOR

[76] Inventor: Jerry D. Troglin, Rte. 1, Box 107, Locust Grove, Okla. 74352

[21] Appl. No.: 59,531

[22] Filed: Jul. 23, 1979

[51] Int. Cl.³ .......................................... F02M 31/00
[52] U.S. Cl. ................................. 123/557; 123/549; 261/142
[58] Field of Search ............... 123/122 E, 133, 122 F, 123/141, 557, 549, 590; 261/142, DIG. 39; 48/180 H

[56] References Cited

U.S. PATENT DOCUMENTS

| | | | |
|---|---|---|---|
| 970,349 | 9/1910 | Owin | 48/180 H |
| 1,096,989 | 5/1914 | Bentley | 261/142 |
| 1,122,038 | 12/1914 | Smith | 123/141 |
| 1,637,104 | 7/1927 | Crone | 123/122 F |
| 1,980,496 | 11/1934 | Musselwhite | 261/DIG. 39 |
| 2,851,027 | 9/1958 | Kivela | 123/122 F |
| 3,209,816 | 10/1965 | McQuerry | 123/122 F |
| 3,786,789 | 1/1974 | Barr | 123/32 EA |
| 4,106,457 | 8/1978 | Totten | 123/122 E |
| 4,180,036 | 12/1979 | Wolf | 123/122 E |
| 4,196,710 | 4/1980 | Lehar | 123/122 E |

*Primary Examiner*—Ronald H. Lazarus
*Attorney, Agent, or Firm*—Head & Johnson

[57] ABSTRACT

A carburetor system for use in combination with an internal combustion engine or the like wherein the fuel from the usual fuel pump is directed into a heating chamber through jets wherein the fuel is atomized upon entry into the chamber, and the atomized fuel is heated to a substantially complete vapor state prior to injection into the venturi of the carburetor. The hot fuel vapor enters the air stream in the venturi for mixing therewith whereupon the fuel-air mixture is directed to the manifold and combustion chamber for burning thereof. The fuel is delivered to the venturi through an orifice which is controlled in direct relation with the throttle valve of the carburetor whereby the air-fuel ratio is maintained at an optimum operation standard through the entire engine operating range. This optimum fuel-air ratio in combination with the heated vapor state of the fuel results in a substantially complete burning of the fuel in the combustion chamber, thus providing fuel efficiency and decreased pollution of the atmosphere.

7 Claims, 3 Drawing Figures

GASOLINE VAPOR COMPLETE BURNING CARBURETOR

BACKGROUND OF THE INVENTION

1. Field of the Invention

This invention relates to improvements in carburetors for internal combustion engines, and the like, and more particularly, but not by way of limitation, to a carburetor system wherein the fuel is heated and vaporized for a substantially complete combustion thereon.

2. Description of the Prior Art

In view of the present day energy crisis and the many environmental problems, there has been a great deal of activity in ways and means for increasing the efficiency of fuel usage in internal combustion engines with a corresponding decrease in undesirable emissions or exhaust pollutants. It has long been recognised that one secret of fuel economy is to increase the percentage of combustion of the fuel, thereby permitting the utilization of more power from the fuel and reducing the exhaust of polluting gases since a greater portion of the fuel is actually consumed rather than vented into the atmosphere. One well known method for increasing the percentage of fuel combustion is the vaporization of the fuel prior to the burning thereof, but the usual devices available today for accomplishing any increased vaporization of the fuel are expensive and frequently caused damage to other components of the engine.

SUMMARY OF THE INVENTION

The present invention contemplates a novel device for use in combination with the carburetor of an internal combustion engine, or the like, and which has been particularly designed and constructed for overcoming the foregoing disadvantages. The novel apparatus comprises an electrically actuated heater interposed between the usual fuel pump and the carburetor. The fuel from the fuel pump is directed through a fuel line having a suitable pressure regulator interposed therein for providing the desired pressure for the fuel entering the interior of the heater. In addition, it is preferable to provide a fuel filter in the fuel line downstream of the pressure regulator for removing impurities in the fuel in order to increase the efficiency of the operation of the apparatus. An electric solenoid is also preferably provided in the fuel line, and is operably connected with the electrical system of the vehicle associated with the engine for controlling the supply of fuel to the heater. The fuel in the fuel line is introduced into the interior of the heater through suitable jets or a nozzle whereby the fuel is atomized upon entry into the heating chamber of the heater, and the temperature within the chamber is maintained relatively high during operation of the engine whereby the atomized fuel is substantially completely vaporized within the chamber. The fuel moves through the chamber in a direction toward an outlet orifice which directs the hot vapor into the venturi area of the carburetor, preferably downstream of the usual throttle valve. The air stream moving through the carburetor is mixed with the fuel vapor and the air-fuel mixture moves into the manifold for passage into the combustion chamber in the usual manner for burning. The ratio of the fuel to the air is maintained at an optimum since the fuel orifice is controlled in direct relation to the throttle valve, thus assuring a most efficient air-fuel mixture for further increasing the efficient burning of the fuel. The novel apparatus is simple and efficient in operation and economical and durable in construction.

DESCRIPTION OF THE PREFERRED EMBODIMENT

Figure 1:
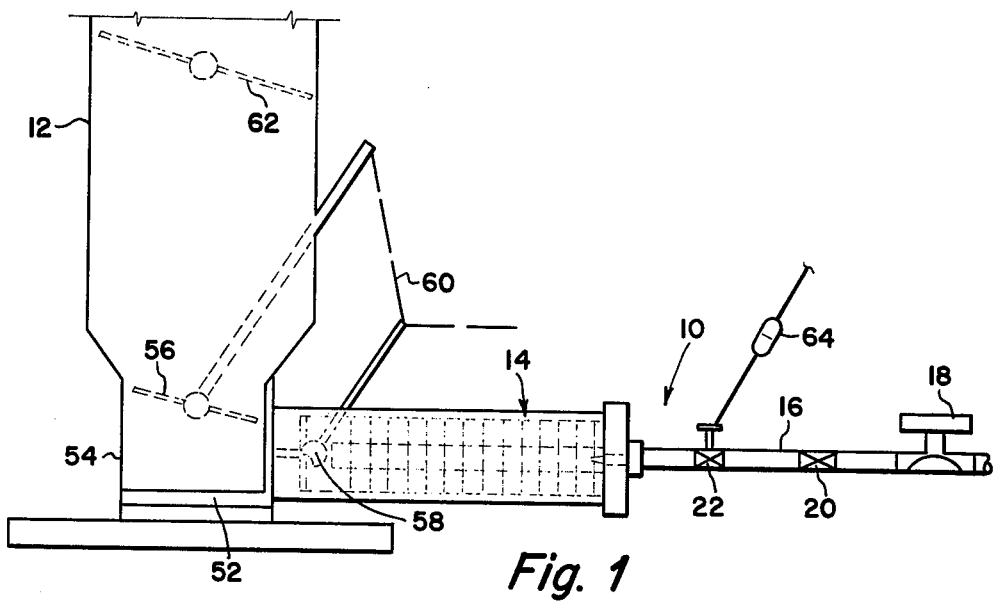
FIG. 1 is a side elevational view of an apparatus embodying the invention as utilized in combination with a carburetor, with portions thereof shown in broken lines for purposes of illustration.

Referring to the drawings in detail, reference character 10 generally indicates a device for use in combination with a carburetor 12 of an internal combustion engine (not shown) or the like, and comprising a heater 14 in communication with the usual fuel pump (not shown) or the fuel supply tank (not shown) of the engine through a fuel line 16. A suitable pressure regulator 18 is preferably interposed in the fuel line 16 downstream of the fuel pump for regulating the pressure of the fuel in the line 16 prior to discharge thereof into the interior of the heater 14 as will be hereinafter set forth. In addition, it is preferable to provide a suitable filter 20 in the line 16 between the pressure regulator 18 and the heater 14 for removal of impurities from the fuel prior to entry thereof into the interior of the heater. A solenoid 22 is interposed in the fuel line 16 between the filter 20 and the heater 14 for controlling the flow of fuel to the heater, and is preferably electrically connected with the electrical system of the vehicle in any suitable or well known manner (not shown) for actuation.

Figure 2:
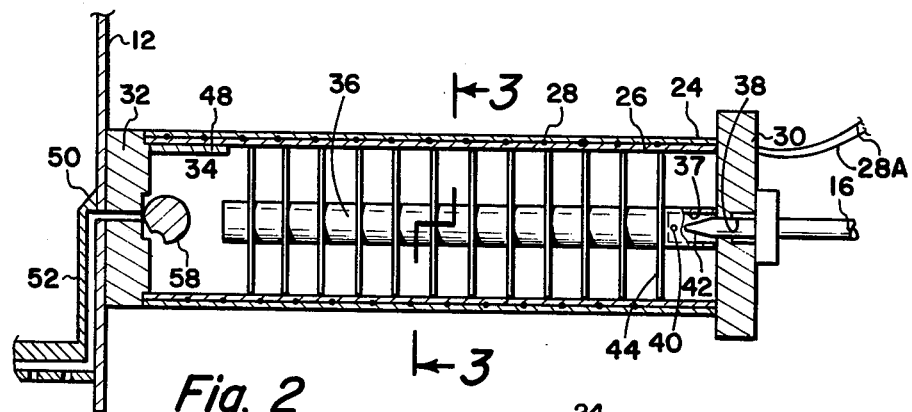
FIG. 2 is a sectional elevational view of a heater of an apparatus embodying the invention.

The heater 14 comprises an outer housing 24 and inner housing 26 having an electric heating element 28 interposed therebetween. The housing 24 and 26 are preferably of a cylindrical configuration and constructed of fused glass, or the like, but not limited therewith. As particularly shown in FIG. 2, the inner diameter of the housing 24 is of a size for snugly receiving the outer diameter of the housing 26 therein whereby the housings are intimately arranged with respect to one another. The heating elements 28 is preferably an electric wire wound helically substantially throughout the length of the housing 24 and 26 and operably connected with the electrical system of the vehicle for applying heat to the housings 24 and 26. One end of the housings 24 and 26 is closed by a first head member 30, and the opposite end thereof is closed by a second head member 32, thus providing a heating chamber 34 for the heating element 14. A rod member 36 is suitably secured to the inner face of the head member 30 and extends longitudinally into the chamber 34. The rod 36 is preferably disposed along the axis of the housings 24 and 26, and one end of the rod 36 is provided with a centrally disposed longitudinally extending bore 37 in open communication with a centrally disposed aperture 38 provided in the head member 30. A plurality of circumferentially spaced ports or apertures 40 are provided in the sidewall of the bore 37 for providing communication between the bore 37 and the chamber 34. A suitable nozzle 42 is secured to the end of the fuel line 16 and extends through the aperture 38 into the bore 37 as particularly shown in FIG. 2 for directing fuel into the bore 37 for a purpose as will be hereinafter set forth.

Figure 3:
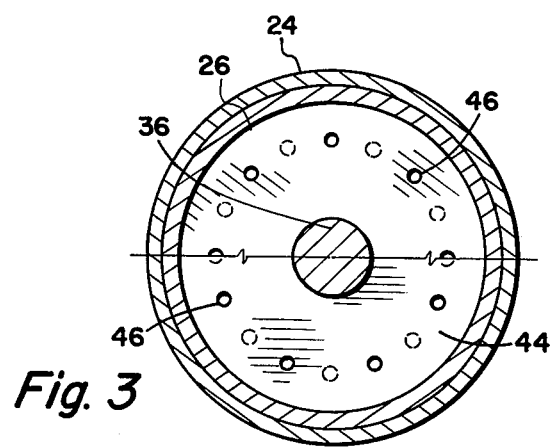
FIG. 3 is a view taken on line 3—3 of FIG. 2, and enlarged for purposes of illustration.

A plurality of outwardly extending circumferential discs or ins 44 are secured to the outer periphery of the rod 36 and are longitudinally spaced therealong. The outer periphery of each fin 44 is preferably in engagement with the inner periphery of the housing 26, but is not an integral part thereof. Each fin 44 is provided with a plurality of circumferentially spaced apertures 46 providing communication between the opposite faces thereof, with the apertures of adjacent fins 44 being offset or staggered with respect to one another as particularly shown in FIG. 3. This provides a tortous path for fluid moving longitudinally through the chamber 34 as will be hereinafter set forth.

A suitable temperature sensor 48 is mounted within the chamber 34 in any well known manner (not shown), and is electrically connected between the electrical system of the vehicle and the heating element 28 for acuation of the heating element 28 as required in accordance with the temperature condition existing in the chamber 34, as will be hereinafter set forth. In addition, an orifice 50 is provided in the head member 32 for discharging fluid from the chamber 34, and into a vapor manifold 52 which is secured within the venturi section 54 of the carburetor 12. The vapor manifold 52 is open to the venturi section 54 downstream of the usual throttle valve 56 of the carburetor as particularly shown in FIG. 1. A movable closure member 58 is secured to the inner face of the head member 32 in any well known manner (not shown) for controlling the size of the opening of the orifice 50, and is operably connected with the throttle valve 56 through a suitable linkage assembly 60 whereby the actuation of the valve 56 and element 58 may be coordinated for assuring a proper ratio of air to fuel for efficient engine operation, as will be hereinafter set forth. Of course, it is preferable that the carbureror 12 also be provided with the usual automatic choke member 62.

In operation, the carburetor 12 may be secured to the usual manifold structure (not shown) of an internal combustion engine, or the like (not shown) in the usual or well known manner, and the fuel line 16 is suitably connected with the usual fuel pump (not shown) for receiving raw fuel therefrom during activation of the engine pistons, all as is well known. The fuel moving into and through the fuel line 16 is normally in a liquid state, and initially passes through the pressure regulator 18 for regulation of the pressure of the flow stream to the optimum pressure for discharge into the chamber 34. The pressurized flow stream then moves through the filter 20 for removal of impurities, and the like, and to the solenoid valve 22. When the engine makes no demand for fuel, the solenoid valve 22 is closed, and the flow stream is blocked from entering the chamber 34. However, when the electrical signal from the engine activates the solenoid for opening thereof, the flow stream moves through the open solenoid and into the nozzle 42 for discharge into the bore 40 at a relatively great pressure and velocity for atomization of the fuel or the flow stream. The fuel in the bore 37 is discharged into the chamber 34 through the ports 40 and enters the chamber upstream of the right hand fin 44 as viewed in FIG. 2. The flow stream moves longitudinally through the chamber 34 in a direction toward the orifice 50, and passes through the staggered ports 46 along its journey. This tortuous flow path further breaks down the fuel particles for increasing the vaporization thereof.

The heating element 28 is energized when the engine is ignited and is calling for fuel, and the heat from the element 28 is radiated into the chamber 34 from the housing members 24 and 26. In addition, the engagement of the fins 44 with the inner periphery of the hot housing 26 causes a transfer of heat to the fins 44. The high temperature within the chamber 34 heats the fuel contained therein, and the flow stream passing through the ports 46 is further heated by the high temperature of the fins 44, thus substantially completely vaporizing the fuel within the chamber 34.

The fuel in this vapor state is discharged from the chamber through the orifice 50 and into the vapor manifold 52, from where it is discharged into the venturi section 54 of the carburetor 12. The carburetor 12, of course, responds to the action of the engine pistons (not shown) for moving an air stream through the choke member 62 of the carburetor and through the throttle valve 56 into the venturi 54. The air stream is mixed with the vaporized fuel discharging from the vapor manifold 52, and the air-fuel mixture moves into the manifold (not shown) for distributiion to the combustion chamber (not shown) in the usual manner whereby the air-fuel mixture is burned for providing the power for the engine. Since the fuel is substantially entirely vaporized, and is also heated, the fuel is substantially completely burned, thus providing for fuel efficiency, and a great reduction in pollution of the atmosphere from the exhaust gases.

When the engine is stopped, as by turning off the ignition, the solenoid valve 22 is closed, and the supply of fuel to the heater 14 is interrupted, thus preventing dieseling of the engine. This also stops the flow of the fuel vapor into the carburetor venturi section. In addition, the solenoid 22 may be provided with a suitable breakable fuse 64 which functions for closing the solenoid valve 22 in case of an accident. In this manner the flow of fuel to the heater is stopped for reducing the possibility of igniting of the fuel under these conditions.

The electrical lease 28A of the heater element 28 may be connected with the vehicle ignition system in both a pre-heat position (not shown) and an ignition operation position (not shown), if desired. The automatic choke 62 is also a desirable feature in that the choke functions to enrich the fuel vapor and air mixture until the engine reaches its normal operating temperature. Of course, the linkage system which coordinates the operation of the throttle valve 56 and the element 58 provides the optimum or correct fuel-air mixture from idle engine operating conditions through full throttle operation conditions therefor.

From the foregoing it will be apparent that the present invention provides a novel device wherein substantially complete burning of fuel is provided during operation of an internal combustion engine, or the like, this increasing fuel efficiency and reducing pollution of the atmosphere. The novel device includes a heater for substantially complete vaporization of the fuel prior to mixing thereof with the air stream, and maintains the fuel-air ratio at an optimum for efficient engine operation.

Whereas the present invention has been described in particular relation to the drawings attached hereto, it should be understood that other and further modifications, apart from those shown or suggested herein may be made within the spirit and scope of this invention.

What is claimed is:

1. A fuel vaporizing device for use in combination with a carburetor and comprising heater means interposed between the carburetor and a supply of fuel for receiving raw fuel therein and selectively increasing the temperature of the fuel, the heater means comprising inner and outer concentrically arranged housings having electrical heating coil means interposed therebetween for transmitting heat to the inner housing for heating of the interior thereof, a plurality of annular fins disposed within the inner housing and each fin having the outer periphery thereof in engagement with the inner periphery of the housing for receiving heat therefrom rod means centrally disposed within the housing and extending longitudinally therein through each of the fins for supporting thereof, an internal chamber provided in one end of the rod means and in open communication with the supply of fuel for receiving the fuel therein, said chamber being provided with a plurality of spaced apertures for injecting the fuel into the interior of the inner housing in a jet action, each of said fins being provided with a plurality of spaced apertures disposed in misalignment with the apertures of the adjacent fins to provide a tortuous path of travel of the fuel for facilitating braking down of the fuel into small particles and for increasing the heating thereof to assure vaporization of the fuel within the interior of the inner housing, and orifice means providing communication between the heater means and the interior of the carburetor for discharging the vaporized fuel into the air stream moving through the carburetor.

2. A fuel vaporizing device as set forth in claim 1 and including adjustable control means for said orifice means to automatically control the discharge of fuel into the carburetor in accordance with the air stream moving therethrough for maintaining an optimum air-fuel ratio deliver from the carburetor.

3. A fuel vaporizing device as set forth in claim 1 and including nozzle means in communication with the fuel supply and the internal chamber of the rod means for admitting the raw fuel into the internal chamber at a preselected pressure and velocity.

4. A fuel vaporizing device as set forth in claim 1 and including fuel line means extending between the heater means and the fuel supply for directing the fuel into the heater, and solenoid valve means is interposed in the fuel line upstream of the heater means for controlling the flow of the fuel through the fuel line for admitting of fuel to the heater means only upon demand for fuel at the carburetor.

5. A fuel vaporizing device as set forth in claim 4 and including pressure regulator means interposed in the fuel line upstream of the solenoid valve means for regulation of the pressure of the fluid prior to entry thereof into the heater means.

6. A fuel vaporizing device as set forth in claim 5 and including filter means interposed in the fuel line between the solenoid valve means and pressure regulator means for removing impurities from the fuel.

7. A fuel vaporizing device as set forth in claim 1 and including safety shut off means operably connected with the heater means for deactivation thereof in case of accident.

* * * * *